United States Patent
Tani

(10) Patent No.: US 11,146,118 B2
(45) Date of Patent: Oct. 12, 2021

(54) WIRELESS POWER SUPPLY SENSING SYSTEM

(71) Applicant: Panasonic Corporation, Osaka (JP)

(72) Inventor: Hiroyuki Tani, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/794,405

(22) Filed: Feb. 19, 2020

(65) Prior Publication Data

US 2020/0185973 A1 Jun. 11, 2020

Related U.S. Application Data

(63) Continuation of application No. PCT/JP2019/018926, filed on May 13, 2019.

(30) Foreign Application Priority Data

May 31, 2018 (JP) .............................. JP2018-104302

(51) Int. Cl.
*H02J 50/40* (2016.01)
*H02J 50/80* (2016.01)
(Continued)

(52) U.S. Cl.
CPC ................ *H02J 50/40* (2016.02); *H02J 7/02* (2013.01); *H02J 50/20* (2016.02); *H02J 50/80* (2016.02)

(58) Field of Classification Search
None
See application file for complete search history.

(56) References Cited

U.S. PATENT DOCUMENTS

| 10,170,942 B2 * | 1/2019 | Takahashi | ............... H02J 50/20 |
| 10,367,374 B2 * | 7/2019 | Tole | ....................... H02J 50/40 |

(Continued)

FOREIGN PATENT DOCUMENTS

| JP | 2002-270856 | 9/2002 |
| JP | 2004-513681 | 5/2004 |

(Continued)

OTHER PUBLICATIONS

International Search Report dated Jul. 23, 2019 in International (PCT) Application No. PCT/JP2019/018926.

*Primary Examiner* — Thomas J. Hiltunen
(74) *Attorney, Agent, or Firm* — Wenderoth, Lind & Ponack, L.L.P.

(57) ABSTRACT

The wireless power supply sensing system includes a transmitter/receiver and a power reception sensor. The transmitter/receiver has: an oscillation unit for generating electrical power; and a control unit for causing electrical power to be radiated into space and instructing an electrical power supply operation by the power reception sensor. In a first mode, in which the charge amount of a secondary cell is equal to or higher than a threshold value, the control unit controls the power reception sensor so that the electrical power received by the power reception sensor is supplied to a sensor unit, and in a second mode, in which the charge amount of the secondary cell is less than the threshold value, the control unit controls the power reception sensor so that the electrical power received by the power reception sensor is supplied to the secondary cell.

12 Claims, 5 Drawing Sheets

(51) Int. Cl.
*H02J 50/20* (2016.01)
*H02J 7/02* (2016.01)

(56) References Cited

U.S. PATENT DOCUMENTS

| | | | |
|---|---|---|---|
| 10,814,130 B2* | 10/2020 | Wong | A61N 1/36 |
| 2002/0052563 A1 | 5/2002 | Penn et al. | |
| 2014/0333257 A1* | 11/2014 | Akiyoshi | H01M 10/44 |
| | | | 320/108 |
| 2016/0329737 A1 | 11/2016 | Yamamoto et al. | |
| 2018/0018070 A1* | 1/2018 | Bhageria | G06F 3/014 |

FOREIGN PATENT DOCUMENTS

| | | |
|---|---|---|
| JP | 2007-089341 | 4/2007 |
| WO | 2015/099159 | 7/2015 |

\* cited by examiner

WIRELESS POWER SUPPLY SENSING SYSTEM

TECHNICAL FIELD

The present disclosure relates to a wireless power supply sensing system that supplies power and transmits information, using wireless communication.

BACKGROUND ART

In recent years, wearable sensors to be mounted on human bodies have been developed. The wearable sensors automatically collect information indicating movement or health conditions of people. Utilization for risk prediction (watching over) or health management and/or the like through analysis of the information are anticipated.

For example, detection of the movement of an elderly person, using a wearable sensor in a nursing home and/or the like makes it possible to notice a fall accident right away, and further makes it possible to prevent a fall in advance through analysis of signs of the movement. Further, continuously performing sensing of body temperature, pulse, and/or the like by wearable sensors makes it possible to notice signs of illness or feeling of unwellness.

Such wearable sensors are in various forms. For example, wearable sensors of a band type to be wrapped around arms, and wearable sensors to be attached to bodies, such as adhesive tapes and compresses are present. Wearable sensors are developed so as to minimize the burden on the bodies based on an assumption that they can be worn all the time. For example, Patent Literature (hereinafter, referred to as "PTL") 1 discloses a wearable sensor of a type which is attached to a body and is capable of sensing of a variety of biological information.

Many of these wearable sensors use batteries as their power sources. Accordingly, charging and/or replacing of the battery is required periodically. In currently commercially available sensors, it is common that batteries run out within several tens of hours in a case where sensing is performed all the time. For example, it is difficult to periodically charge and/or replace batteries for wearable sensors for watching over because sensing needs to be performed all the time.

Accordingly, as to wearable sensors, enabling permanent sensing without the need for charging and/or replacing batteries has been in demand For this reason, for example, utilization of power from energy harvest (environmental power generation) as a power source for wearable sensors is a possibility.

Wearable sensors without batteries may be realized by supplying the wearable sensors with the power generated from light or vibration, or heat and/or the like.

The power generation devices used in energy harvest, however, cannot generate sufficient power unless they are under certain conditions. Therefore, it is difficult to always supply the necessary power to the wearable sensors.

In this respect, application of a wireless power supply method to wearable sensors is considered. The wireless power supply method is, for example, a method in which the power wirelessly transmitted from a transmitter installed in a predetermined indoor location is received by a sensor present within a well-visible range from the transmitter.

A conventional wireless power supply sensing system will be described with reference to FIG. 5. FIG. 5 is a schematic diagram illustrating an example of a conventional wireless power supply sensing system.

As illustrated in FIG. 5, the wireless power supply sensing system includes transmitter 101 and a plurality of power receiving functional sensors 104.

Transmitter 101 includes high-frequency oscillator 102 and antenna 103. Power receiving functional sensors 104 each include antenna 105 and sensor 106.

The high frequency power generated by oscillator 102 is radiated from antenna 103 as an electromagnetic wave, travels through the space, reaches each of power receiving functional sensors 104, and is received by antennas 105. The received high frequency power is converted to DC power and then utilized as power sources for sensors 106 for collecting information.

In the wireless power supply sensing system illustrated in FIG. 5, power can be supplied to power receiving functional sensors 104 within a range where radio waves from transmitter 101 can reach. Accordingly, charging and replacing of the batteries are no longer required in power receiving functional sensors 104, and further, the need for power supply wiring is eliminated as well.

CITATION LIST

Patent Literature

PTL 1
Japanese Patent Application Laid-Open No. 2002-270856

SUMMARY OF INVENTION

Technical Problem

In the conventional wireless power supply sensing system described above, however, the supply of power varies in accordance with the positional relationship between antenna 103 of transmitter 101 and antennas 105 of power receiving functional sensors 104.

More specifically, in a case where the power transmission direction of antenna 103 coincides with the power receiving direction of antenna 105, the supply of power increases. Meanwhile, in a case where the power transmission direction of antenna 103 and the power receiving direction of antenna 105 do not coincide with each other (e.g., in a case where both directions are opposite), the supply of power decreases.

In a case where power receiving functional sensors 104 are applied to wearable sensors, the power receiving directions of antennas 105 change often along with human movement. Accordingly, the case where the power receiving directions of antennas 105 do not coincide with the power transmission direction of antenna 103 occurs very often. As a result, the power required for the operation of sensors 106 may not be supplied, and there arises a concern that sensors 106 cannot collect information.

An object of one aspect of the present disclosure is to provide a wireless power supply sensing system capable of stably collecting information even when the power receiving direction changes.

Solution to Problem

A wireless power supply sensing system according to one aspect of the present disclosure is a wireless power supply sensing device that receives power radiated into space and that performs sensing using the power, and the wireless power supply sensing system includes: a battery that stores therein the power; and a controller that supplies the power stored in the battery to a sensor that performs the sensing.

A wireless power supply sensing system according to one aspect of the present disclosure is a wireless power supply sensing device that communicates with a power receiving sensor that performs sensing, using power radiated into space, and the wireless power supply sensing system includes: an oscillator that generates the power; and a controller that causes the power to be radiated into the space and indicates a supply operation of the power in the power receiving sensor, in which the controller transmits, to the power receiving sensor, control information indicating that the power received by the power receiving sensor is supplied to a sensor provided in the power receiving sensor, in a case where a charge amount of a battery provided in the power receiving sensor is equal to or greater than a predetermined threshold, and the controller transmits, to the power receiving sensor, control information indicating that the power received by the power receiving sensor is supplied to the battery, in a case where the charge amount of the battery is less than the predetermined threshold.

A wireless power supply sensing system according to one aspect of the present disclosure includes: a transceiver that radiates power into space and receives information; and a power receiving sensor that receives the power and performs sensing, in which the transceiver includes: an oscillator that generates the power; and a second controller that causes the power to be radiated into the space and indicates a supply operation of the power in the power receiving sensor, and in which the second controller transmits, to the power receiving sensor, control information indicating that the power received by the power receiving sensor is supplied to a sensor provided in the power receiving sensor, in case of a first mode in which a charge amount of a battery provided in the power receiving sensor is equal to or greater than a predetermined threshold, and the second controller transmits, to the power receiving sensor, control information indicating that the power received by the power receiving sensor is supplied to the battery, in case of a second mode in which the charge amount of the battery is less than the predetermined threshold, and in which the power receiving sensor includes: a battery that stores therein the power; a sensor that performs the sensing; and a first controller that supplies the power stored in the battery to the sensor.

Advantageous Effects of Invention

According to the present disclosure, it is made possible to collect information stably even when the power receiving direction changes.

DESCRIPTION OF EMBODIMENTS

Figure 1:
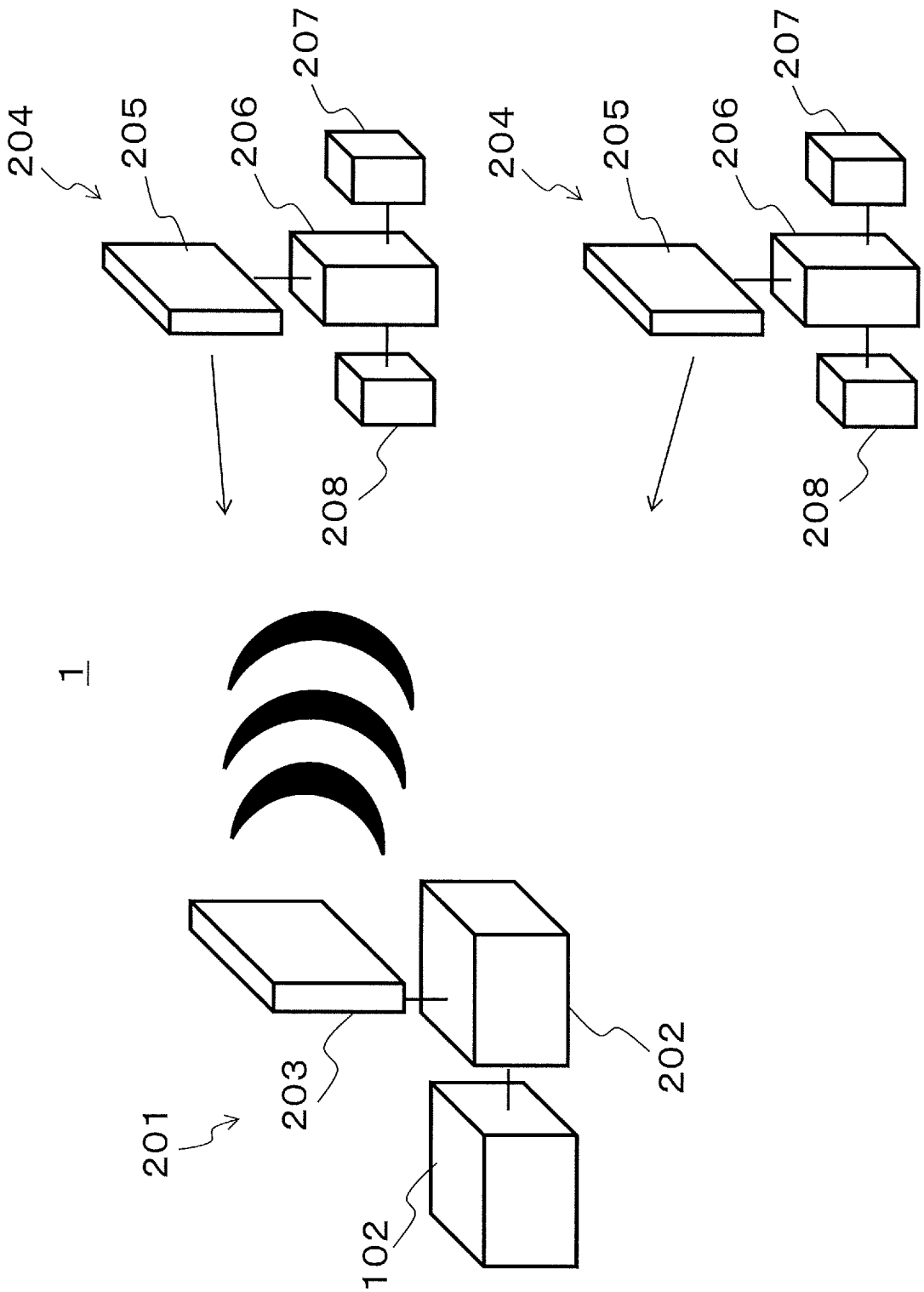
FIG. 1 is a schematic diagram illustrating a configuration example of a wireless power supply sensing system according to an embodiment of the present disclosure.

Hereinafter, an embodiment of the present disclosure will be described with reference to the drawings. Note that, the same reference numerals are assigned the configuration elements common to the drawings, and their descriptions are omitted as appropriate.

<Configuration of Wireless Power Supply Sensing System 1>

First, a description will be given of a configuration of wireless power supply sensing system 1 according to an embodiment of the present disclosure with reference to FIG. 1. FIG. 1 is a schematic diagram illustrating a configuration example of wireless power supply sensing system 1 according to the present embodiment.

Wireless power supply sensing system 1 includes transceiver 201 and power receiving sensors 204 (both being an exemplary wireless power supply sensing device).

Power receiving sensors 204 are, for example, wearable sensors. Although two power receiving sensors 204 are illustrated in FIG. 1, as an example, the number of power receiving sensors 204 may be one or three or more.

Transceiver 201 includes oscillator 102, antenna 203, and controller 202.

Oscillator 102 is configured with a quartz oscillator and/or an electrical circuit, such as a phase locked loop (PLL) circuit and/or an amplification circuit (AMP), and generates high frequency power from, for example, a commercial power supply. The frequency to be generated is selected in accordance with the distance for power transmission and/or the size of transceiver 201. The frequencies to be selected include, but are not limited to, microwave bands, such as a 900 MHz band, 2.45 GHz band, and 5.8 GHz band.

Antenna 203 radiates the high frequency power generated by oscillator 102 into the space as a radio wave (electromagnetic wave).

Further, antenna 203 receives notification information transmitted from power receiving sensors 204. The notification information includes, for example, ID information capable of identifying power receiving sensor 204, and either sensing information indicating a result of detection by sensor 207 or charge amount information indicating the charge amount of secondary battery 208.

Further, antenna 203 transmits control information for controlling the operation of power receiving sensors 204 to power receiving sensors 204. The control information is information for operating power receiving sensors 204 in either a first mode or a second mode. The first and the second modes will be described, hereinafter.

Note that, either a directional antenna or a non-directional antenna may be used as antenna 203. A directional antenna may be used in a case where long-distance power transmission in a specific direction is desired, and a non-directional antenna may be used in a case where short-distance power transmission over a wide range is desired.

Examples of directional antennas include a planar patch antenna in which a dielectric substrate is placed between a GND plate and an antenna plate. Meanwhile, examples of non-directional antennas include a linear dipole antenna or monopole antenna formed by linearly extending a conductive wire or the like through which electricity flows.

Controller 202 (an example of a second controller) includes, for example, a central processing unit (CPU), a storage medium, such as a Read Only Memory ROM)

storing therein a control program, a working memory, such as a Random Access Memory (RAM), and a communication circuit (illustration of these components are omitted). Each function of controller 202 to be described hereinafter is implemented by execution of a computer program by the CPU.

Controller 202 outputs the high frequency power generated by oscillator 102 to antenna 203 and controls antenna 203 so as to radiate the high frequency power into the space as electromagnetic waves.

Further, in a case where antenna 203 receives the notification information, controller 202 determines the power supply mode to be indicated to power receiving sensor 204, based on the notification information. The power supply mode includes a first mode for supplying the received power to sensor 207 and a second mode for supplying the received power to the secondary battery 208.

Controller 202 then controls antenna 203 to transmit control information indicating either the first mode or the second mode to power receiving sensor 204.

Further, controller 202 may cause the received notification information to be stored in a predetermined storage unit (illustration is omitted). This storage unit may be a storage device provided in transceiver 201 (controller 202) or a storage device provided outside of transceiver 201.

Power receiving sensor 204 includes antenna 205, sensor 207, secondary battery 208, and controller 206.

Antenna 205 is the same type of antenna as antenna 203.

Antenna 205 receives electromagnetic waves radiated from transceiver 201.

Further, antenna 205 transmits notification information to transceiver 201.

Antenna 205 also receives control information from transceiver 201.

Figure 3:
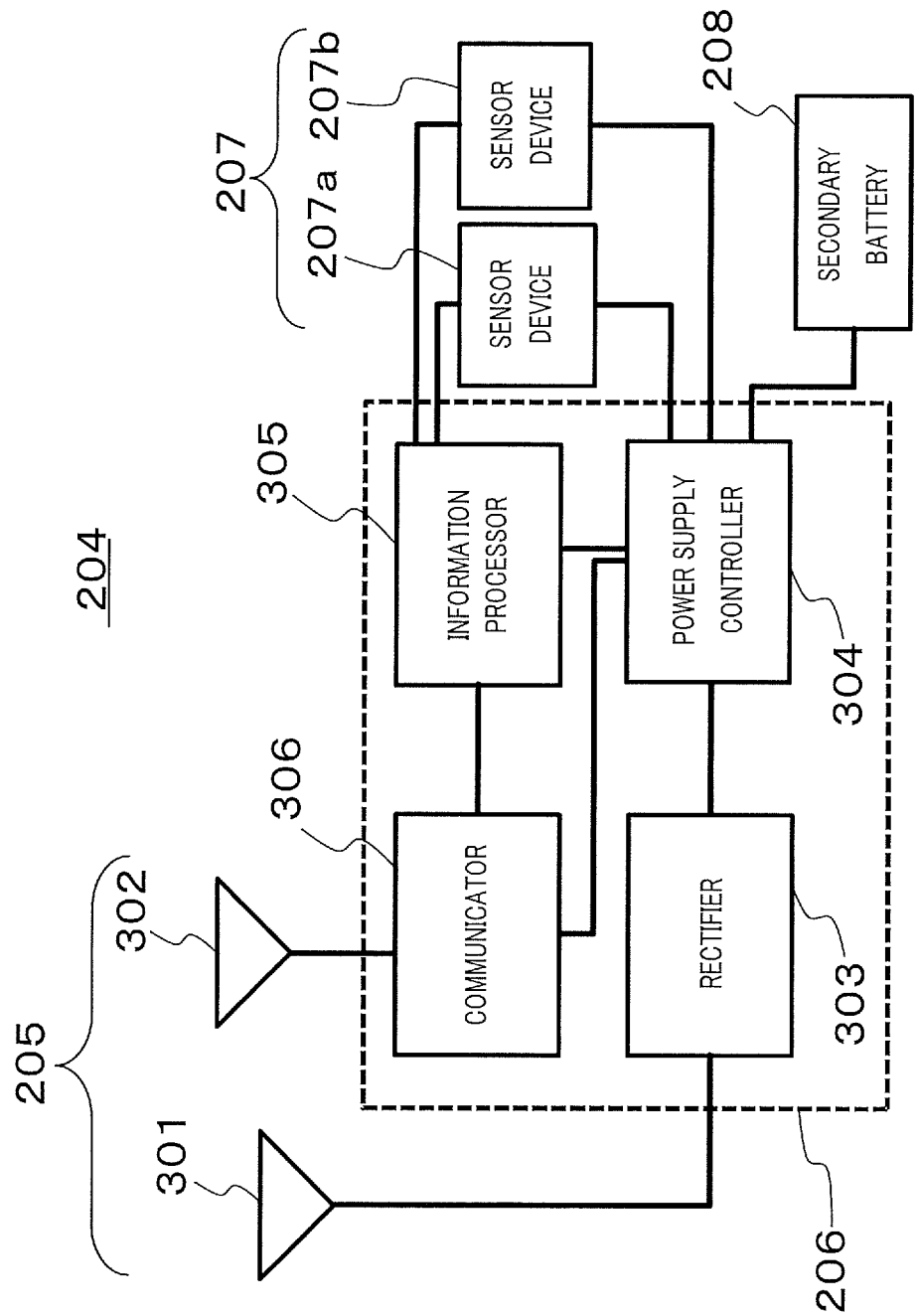
FIG. 3 is a block diagram illustrating a configuration example of a power receiving sensor according to the embodiment of the present disclosure.

Sensor 207 is configured with one or more sensor devices (see FIG. 3). Sensor devices may be, for example, acceleration sensors for sensing human movement (for watching over), sensors for sensing body temperature, or sensors for sensing heart rate (for health management).

Sensor 207 outputs a signal indicating a result of the sensing to controller 206.

Secondary battery 208 (exemplary battery) stores the DC power supplied from controller 206 (details will be given, hereinafter). Further, secondary battery 208 supplies the stored power to sensor 207 through the control of controller 206.

Secondary battery 208 may be, for example, a capacitor that stores a small capacity power in a short time to emit the power, or a storage device (such as a lithium ion battery) that emits power while storing the power for a long time.

As with controller 202, controller 206 (an example of the first controller) includes, for example, a CPU, a storage medium, such as a ROM storing therein a control program, a working memory, such as a RAM, and a communication circuit (illustration of these component is omitted). Each function of controller 206 to be described hereinafter is implemented by execution of the computer program by the CPU.

Controller 206 converts the high frequency power received by antenna 205 to DC power and supplies the DC power to sensor 207 or secondary battery 208.

The supply destination of the DC power is determined based on the control information received from transceiver 201. That is, when the control information indicates the first mode, controller 206 supplies the DC power to sensor 207, and when the control information indicates the second mode, controller 206 supplies (charges) secondary battery 208 with the DC power.

Note that, the DC power is also used as the power supply to operate controller 206 itself.

Further, controller 206 makes a control such that the power stored (charged) in secondary battery 208 is supplied to sensor 207.

Moreover, controller 206 generates the sensing information indicating a result of the sensing by sensor 207, based on the signal received from sensor 207.

Controller 206 also measures the charge amount of secondary battery 208 and generates the charge amount information indicating a result of the measurement.

Further, controller 206 controls antenna 205 to transmit the notification information to transceiver 201. As described above, this notification information includes either sensing information or charging amount information in addition to ID information. The ID information is held by controller 206 itself, for example.

Details of the configuration of controller 206 will be given, hereinafter, with reference to FIG. 3.

<Operation of Wireless Power Supply Sensing System 1>

Figure 2:
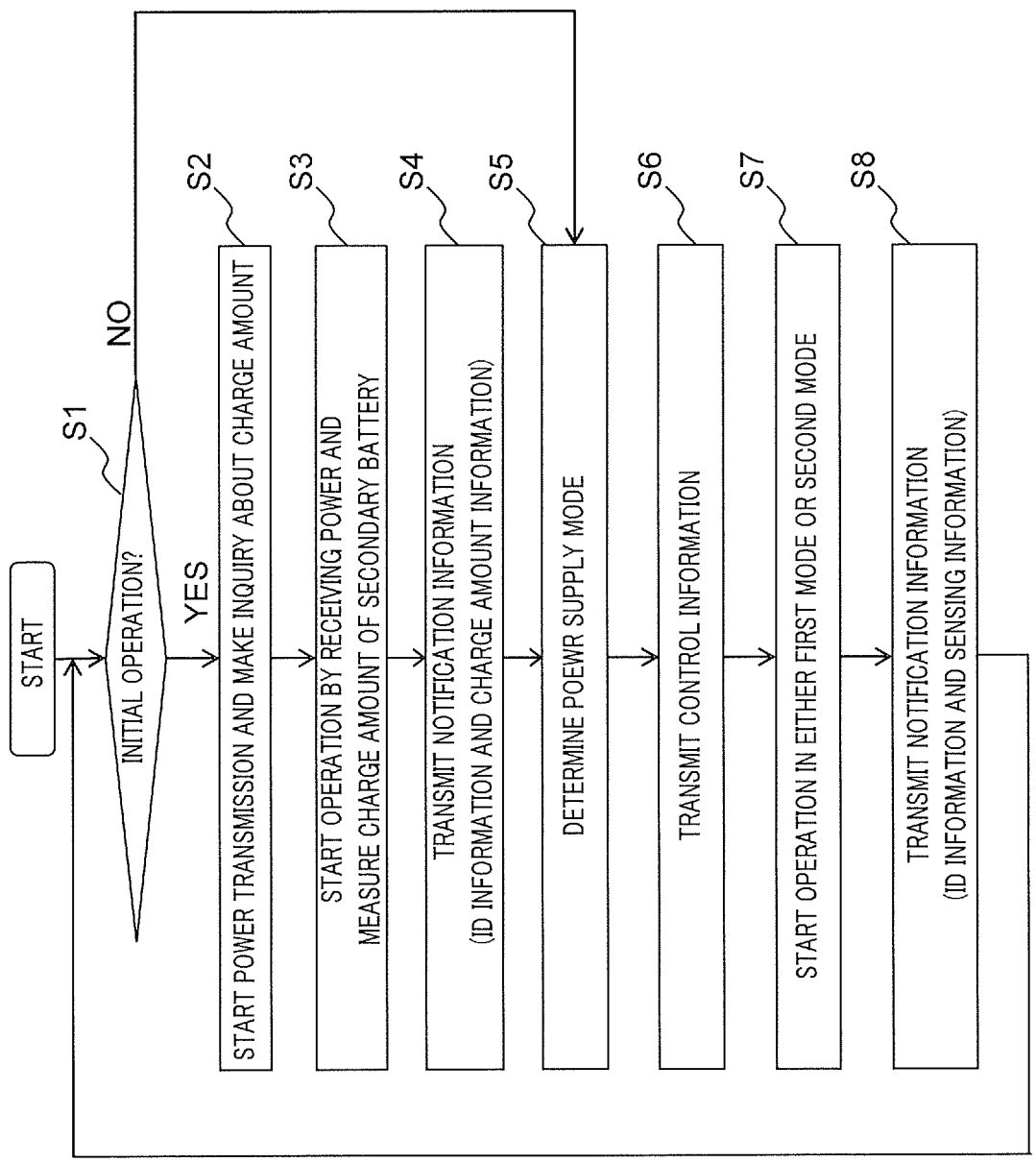
FIG. 2 is a flowchart illustrating an operation example of the wireless power supply sensing system according to the embodiment of the present disclosure.

Next, an operation of wireless power supply sensing system 1 will be described with reference to FIG. 2. FIG. 2 is a flowchart illustrating an operation example of wireless power supply sensing system 1. Hereinafter, an example will be described where processing is performed between transceiver 201 and one power receiving sensor 204.

First, transceiver 201 determines whether or not to execute an initial operation (step S1).

The initial operation refers to an operation in which transceiver 201 acquires charge amount information of secondary battery 208 from power receiving sensor 204. The initial operation may be performed, for example, at the start-up of wireless power supply sensing system 1 (or transceiver 201) or at a predetermined time per day. The timing of execution can be optionally set by the user.

When the initial operation is not executed (step S1: NO), the flow proceeds to step S5, which will be described, hereinafter.

When the initial operation is executed (step S1: YES), transceiver 201 starts power transmission (radiation of high frequency power) and also makes an inquiry for the charge amount of secondary battery 208 to power receiving sensor 204 (step S2).

Power receiving sensor 204 starts the operation by receiving power and measures the charge amount of secondary battery 208 (step S3).

Power receiving sensor 204 transmits notification information to transceiver 201 (step S4). The notification information herein includes the ID information and the charge amount information.

Transceiver 201 determines the power supply mode of power receiving sensor 204 based on the received charge amount information (step S5). Details of this method for determining this power supply mode will be given, hereinafter.

Transceiver 201 transmits the control information indicating the determined power supply mode (first mode or second mode) to power receiving sensor 204 (step S6).

Power receiving sensor 204 starts the operation in either the first mode or the second mode indicated in the received control information (step S7).

Power receiving sensor 204 transmits notification information to transceiver 201 (step S8). The notification information herein includes the ID information and the sensing information.

Steps S1 through S8 described above are repeatedly performed at constant intervals. The intervals can be optionally set by the user. For example, in a case where power receiving sensor 204 is a wearable sensor for watching over, transceiver 201 needs to collect sensing information all the time, so that the intervals to be set are preferably about a few seconds.

Note that, as illustrated in FIG. 1, when a plurality of power receiving sensors 204 are present for one transceiver 201, the above-described steps S1 through S8 are performed sequentially for each of power receiving sensors 204.

<Method for Determining Power Supply Mode>

A description will be given of a specific example of a method for determining the power supply mode performed by controller 202 of transceiver 201 (step 55 illustrated in FIG. 2).

First, transceiver 201 estimates the charge amount of secondary battery 208 at a predetermined time.

The process of this estimation uses the charge amount in the initial state, which is indicated in the charge amount information received from power receiving sensor 204 (hereinafter simply referred to as a "charge amount"), the amount of power received by power receiving sensor 204 (hereinafter referred to as the "received power amount"), and the amount of power consumed by sensor 207 (hereinafter referred to as "power consumption amount"). The charge amount in the initial state refers to the charge amount of secondary battery 208, which is measured when power receiving sensor 204 receives the inquiry about the charge amount from transceiver 201. Further, the power consumption amount is measured by controller 206 based on the voltage and current values of sensor 207, every time the power supply mode is determined, for example. The measured power consumption amount is included, for example, in the charge amount information to be transmitted to transceiver 201.

The received power amount correlates with the radio wave intensity of the notification information (ID information and charge amount information) to be received by transceiver 201. Accordingly, transceiver 201 is capable of estimating the received power amount by multiplying the radio wave intensity of the received notification information by a constant correlation coefficient.

The charge amount P(t) at a predetermined time t is then calculated by Equation 1 below.

[Equation 1]

$$P(t) = P(0) + K \times \int_0^t P_i(t)\,dt - \int_0^t P_s(t)\,dt \quad (1)$$

In Equation 1 above, P(0) represents the charge amount in the initial state. Pi(t) represents the radio wave intensity of the notification information at time t. Further, Ps(t) represents the power consumption amount at time t. Further, K represents the correlation coefficient.

Next, transceiver 201 determines the power supply mode to be indicated to power receiving sensor 204, based on the charge amount computed using Equation 1 described above.

The process of this determination uses a threshold defined based on a result of a previously conducted experiment and/or simulation.

Transceiver 201 determines that the power supply mode to be indicated is the first mode (the mode for supplying power to sensor 207), in a case where the computed charge amount is equal to or greater than the threshold. Meanwhile, transceiver 201 determines that the power supply mode to be indicated is the second mode (the mode for supplying power to secondary battery 208), in a case where the computed charge amount is less than the threshold.

<Configuration of Power Receiving Sensor 204> A configuration of power receiving sensor 204 will be described with reference to FIG. 3. FIG. 3 is a block diagram illustrating a configuration example of power receiving sensor 204.

As illustrated in FIG. 3, antenna 205 includes power receiving antenna 301 and communication antenna 302.

Power receiving antenna 301 is used to receive high frequency power radiated from transceiver 201.

Communication antenna 302 is used to transmit and receive information (e.g., notification information and control information) to and from transceiver 201.

As illustrated in FIG. 3, sensor 207 includes sensor devices 207a and 207b.

As described above, sensor devices 207a and 207b are sensor devices, each configured to sense (sensing), for example, human movement, body temperature, or heart rate. Note that, two sensor devices are illustrated in the example illustrated in FIG. 3, but the number of sensor devices is not limited to two. It is possible to increase the number of sensor devices within the range of power to be supplied.

As illustrated in FIG. 3, controller 206 includes rectifier 303, power supply controller 304, information processor 305, and communicator 306.

Rectifier 303 converts the high frequency power received by power receiving antenna 301 to DC power.

Power supply controller 304 supplies the DC power from rectifier 303 to information processor 305 and communicator 306.

In a case where the control information received by communication antenna 302 indicates the first mode, power supply controller 304 supplies the DC power from rectifier 303 to sensor 207 (sensor devices 207a and 207b). Meanwhile, when the control information received by communication antenna 302 indicates the second mode, power supply controller 304 supplies the DC power from rectifier 303 to secondary battery 208.

Further, when the DC power from rectifier 303 is less than the power amount required for the operation of power receiving sensor 204 (e.g., information processor 305, communicator 306, and/or sensor 207), power supply controller 304 supplies the power stored in secondary battery 208 to information processor 305, communicator 306, and sensor 207.

Power supply controller 304 measures the charge amount of secondary battery 208 and outputs a signal indicating a result of the measurement to information processor 305.

Communicator 306 controls communication antenna 302 to transmit the notification information to transceiver 201.

Further, communicator 306 outputs the information received by communication antenna 302 (e.g., charge amount inquiry information and/or control information) to power supply controller 304.

Information processor 305 acquires a signal indicating the result of sensing from sensor 207 and generates the sensing information based on the signal.

Further, information processor 305 acquires a signal indicating the result of measurement from power supply controller 304 and generates the charge amount information based on the signal.

Moreover, information processor 305 reads ID information from a predetermined storage unit (illustration is omitted) and generates notification information including the ID information and either the charge amount information or the sensing information. Information processor 305 instructs communicator 306 to transmit the notification information at a certain timing.

<Effects>

As described above, in power receiving sensor 204 of the present embodiment, sensing by sensor 207 can be realized, using the power charged to secondary battery 208.

Accordingly, there is no concern of running out of battery, and even in a situation where the received power fluctuates due to a change in the power receiving direction of wireless power supply, information can be collected stably.

Further, transceiver 201 of the present embodiment also controls the operation of power receiving sensor 204 in accordance with the charge amount of secondary battery 208 of power receiving sensor 204. Thus, the power can be efficiently consumed in power receiving sensor 204. Moreover, it is not necessary for the user to sequentially check the charge state of secondary battery 208.

The present disclosure is not limited to the description of the embodiment described above, and various modifications are possible to the extent not departing from the gist of the present disclosure. Hereinafter, variations will be described.

[Variation 1]

As illustrated in FIG. 1, when a plurality of power receiving sensors 204 are present for one transceiver 201, the following operation may be performed.

Transceiver 201 compares the charge amount information received from each of power receiving sensors 204 and determines power receiving sensor 204 which has the largest charge amount of secondary battery 208 among the plurality of power receiving sensors 204.

Transceiver 201 transmits, to power receiving sensor 204, which has the largest charge amount of secondary battery 208, control information indicating to supply the power charged to secondary battery 208 to sensor 207. Power receiving sensor 204 having received this control information supplies power from secondary battery 208 to sensor 207.

Meanwhile, transceiver 201 transmits, to power receiving sensor 204 other than power receiving sensor 204, which has the largest charge amount of secondary battery 208, control information indicating the second mode. Power receiving sensor 204 having received this control information charges secondary battery 208 with the power received from transceiver 201.

In the above description, the case where transceiver 201 transmits control information to each of power receiving sensors 204 has been described as an example, but the present disclosure is not limited to this case. For example, transceiver 201 may transmit, to each of power receiving sensors 204, information on the result of determination which indicates whether or not power receiving sensor 204 is power receiving sensor 204 having the largest charge amount of secondary battery 208. In a case where the information on the result of determination indicates that power receiving sensor 204 has the largest charge amount of secondary battery 208, power receiving sensor 204 supplies power to sensor 207 from secondary battery 208. Meanwhile, in a case where the information on the result of determination indicates that power receiving sensor 204 does not have the largest charge amount of secondary battery 208, each of power receiving sensors 204 charges secondary battery 208 with the power received from transceiver 201.

Performing the above-described operation in real time makes it possible to realize a stable sensing operation even under the environment where the received power of each of power receiving sensors 204 fluctuates.

[Variation 2]

As illustrated in FIG. 3, the case where antenna 205 of power receiving sensor 204 is configured with power receiving antenna 301 and communication antenna 302 has been described as an example, but the present disclosure is not limited to this case. For example, power receiving sensor 204 may receive power and transmit and receive various information through a common (identical) antenna. A specific example of this case will be described with reference to FIG. 4.

Figure 4:
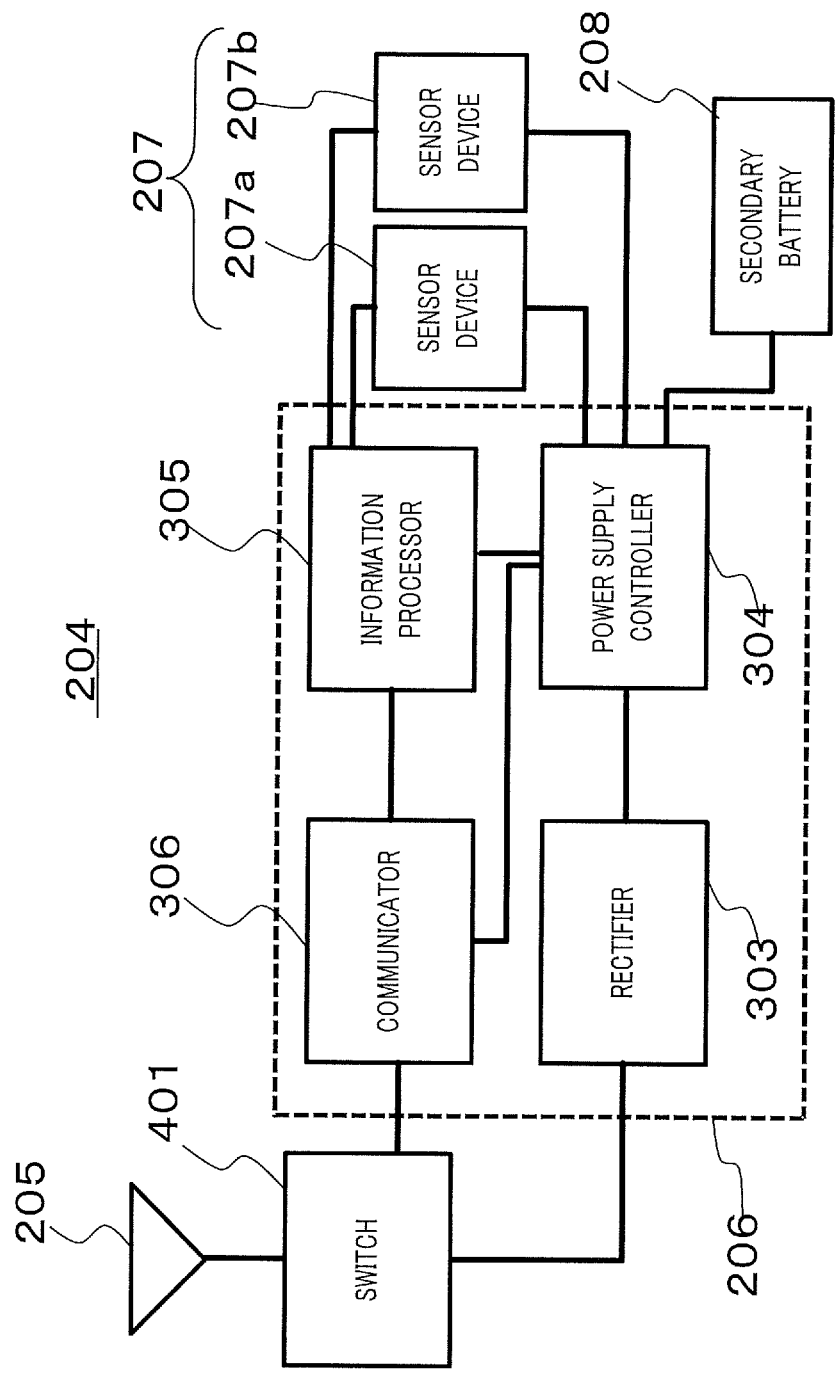
FIG. 4 is a block diagram illustrating a configuration example of a power receiving sensor according to Variation 2 of the present disclosure.
Figure 5:
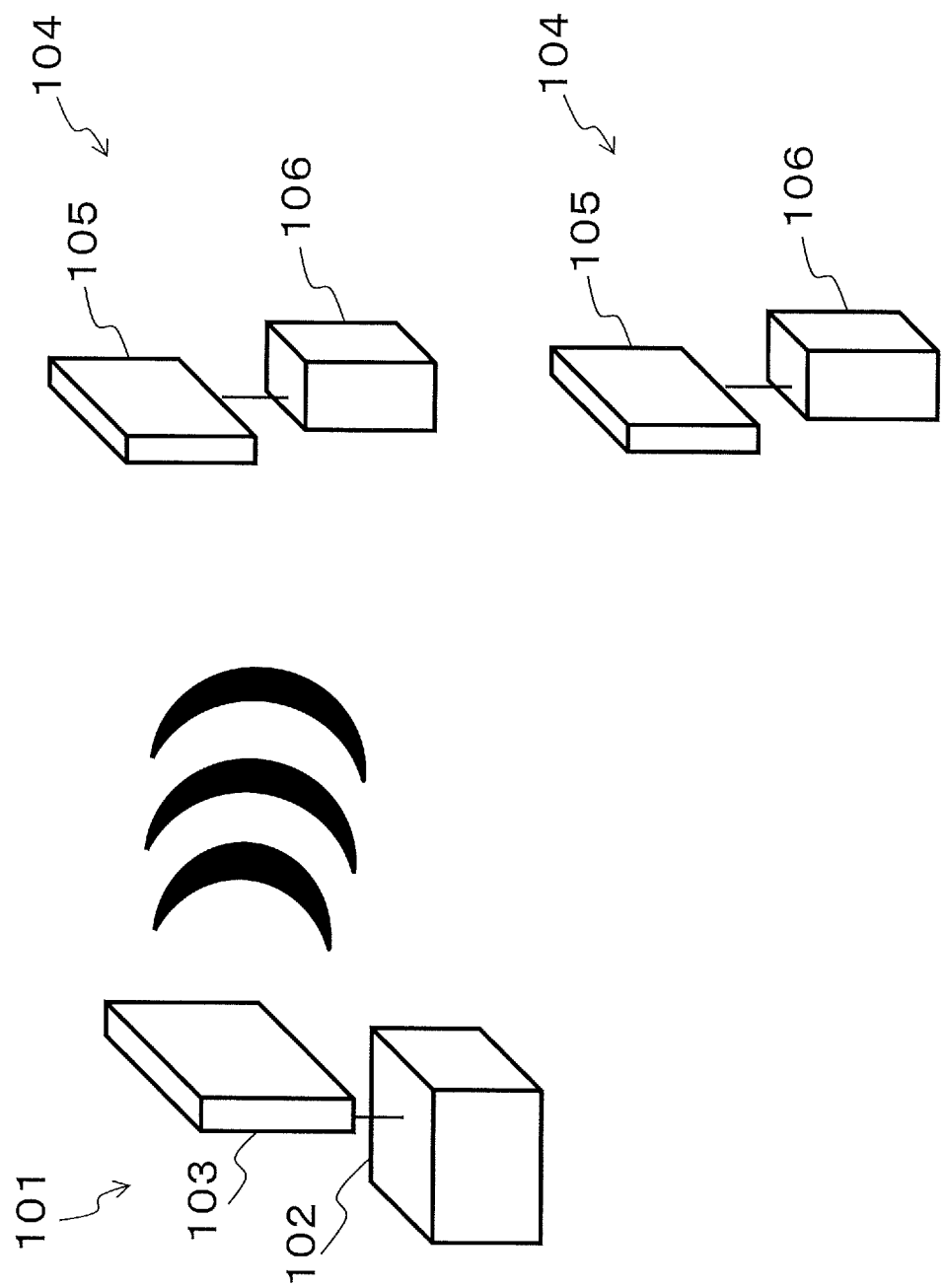
FIG. 5 is a schematic diagram illustrating an example of a conventional wireless power supply sensing system.

Antenna 205 illustrated in FIG. 4 includes power receiving and communication functions.

Further, as illustrated in FIG. 4, power receiving sensor 204 includes switch 401 that switches between the power receiving function and the communication function of antenna 205. For example, in a case where the frequency used in the power receiving function and the communication function is the same or substantially the same, switch 401 switches between the connection between antenna 205 and rectifier 303 and the connection between antenna 205 and communicator 306.

The disclosure of Japanese Patent Application No. 2018-104302, filed on May 31, 2018, including the specification, drawings, and abstract is incorporated herein by reference in its entirety.

INDUSTRIAL APPLICABILITY

The wireless power supply sensing system of the present disclosure is applicable to various sensors, such as wearable sensors.

REFERENCE SIGNS LIST

1 Wireless power supply sensing system
101 Transmitter
102 Oscillator
103 Antenna
104 Power receiving functional sensor
105 Antenna
106 Sensor
201 Transceiver
202 Controller
203 Antenna
204 Power receiving sensor
205 Antenna
206 Controller
207 Sensor
207a, 207b Sensor devices
208 Secondary battery
301 Power receiving antenna
302 Communication antenna
303 Rectifier
304 Power supply controller
305 Information processor
306 Communicator
401 Switch

The invention claimed is:

1. A wireless power supply sensing system, comprising:
a transceiver that radiates power into space and receives information; and
a power receiving sensor that receives the power and performs sensing, wherein
the power receiving sensor includes:
   a battery that stores therein the power;
   a sensor that performs the sensing; and
   a first controller that supplies the power stored in the battery to the sensor, wherein
a plurality of the power receiving sensors are present, and wherein
the transceiver determines, based on the information received from the plurality of power receiving sensors, which power receiving sensor has the largest charge amount of the battery among the plurality of power receiving sensors,
the transceiver makes a control for the power receiving sensor having the largest charge amount of the battery such that the power stored in the battery is supplied to the sensor, and
the transceiver makes a control for another one or more of the plurality of power receiving sensors other than the power receiving sensor having the largest charge amount of the battery such that the power received from the transceiver is supplied to the battery.

2. A wireless power supply sensing system, comprising:
a transceiver that radiates power into space and receives information; and
a power receiving sensor that receives the power and performs sensing, wherein
the transceiver includes:
   an oscillator that generates the power; and
   a second controller that causes the power to be radiated into the space and indicates a supply operation of the power in the power receiving sensor, and wherein
the second controller transmits, to the power receiving sensor, control information indicating that the power received by the power receiving sensor is supplied to a sensor provided in the power receiving sensor, in case of a first mode in which a charge amount of a battery provided in the power receiving sensor is equal to or greater than a predetermined threshold, and
the second controller transmits, to the power receiving sensor, control information indicating that the power received by the power receiving sensor is supplied to the battery, in case of a second mode in which the charge amount of the battery is less than the predetermined threshold.

3. The wireless power supply sensing system according to claim 2, wherein
the second controller compares charge amounts of the batteries of a plurality of the power receiving sensors, and wherein
the second controller transmits, to at least one of the plurality of power receiving sensors which has the largest charge amount, the control information indicating that the power stored in the battery is supplied to the sensor, and
the second controller transmits, to at least one of the plurality of power receiving sensors other than the at least one of the plurality of power receiving sensors which has the largest charge amount, the control information indicating that the power received is supplied to the battery.

4. The wireless power supply sensing system according to claim 2, wherein
in a case where sensing information indicating a result of sensing by the sensor is received from the power receiving sensor, the second controller causes the sensing information to be stored in a predetermined storage unit.

5. The wireless power supply sensing system according to claim 2, wherein the power receiving sensor is a wearable sensor.

6. A wireless power supply sensing system, comprising:
a transceiver that radiates power into space and receives information; and
a power receiving sensor that receives the power and performs sensing, wherein
the transceiver includes:
   an oscillator that generates the power; and
   a second controller that causes the power to be radiated into the space and indicates a supply operation of the power in the power receiving sensor, and wherein
the second controller transmits, to the power receiving sensor, control information indicating that the power received by the power receiving sensor is supplied to a sensor provided in the power receiving sensor, in case of a first mode in which a charge amount of a battery provided in the power receiving sensor is equal to or greater than a predetermined threshold, and
the second controller transmits, to the power receiving sensor, control information indicating that the power received by the power receiving sensor is supplied to the battery, in case of a second mode in which the charge amount of the battery is less than the predetermined threshold, and wherein
the power receiving sensor includes:
   a battery that stores therein the power;
   a sensor that performs the sensing; and
   a first controller that supplies the power stored in the battery to the sensor.

7. The wireless power supply sensing system according to claim 6, wherein
the first controller makes a control such that the power received by the power receiving sensor is supplied to the sensor, in a case where the control information indicates the first mode, and
the first controller makes a control such that the power received by the power receiving sensor is supplied to the battery, in a case where the control information indicates the second mode.

8. The wireless power supply sensing system according to claim 6, wherein a plurality of the power receiving sensors are present for the transceiver being a single transceiver.

9. The wireless power supply sensing system according to claim 6, wherein a plurality of types of the sensors are present for the power receiving sensor being a single power receiving sensor.

10. The wireless power supply sensing system according to claim 6, wherein the transceiver includes an antenna that radiates the power into the space and that transmits and receives information to and from the power receiving sensor.

11. The wireless power supply sensing system according to claim 6, wherein the power receiving sensor includes:
a power receiving antenna that receives power from the transceiver; and
a communication antenna that transmits and receives information to and from the transceiver.

12. The wireless power supply sensing system according to claim 11, wherein the power receiving antenna and the communication antenna are a single common antenna.

\* \* \* \* \*